(12) United States Patent
Morii et al.

(10) Patent No.: US 7,140,463 B2
(45) Date of Patent: Nov. 28, 2006

(54) SNOWMOBILE EQUIPPED WITH A FOUR-CYCLE ENGINE AND INTAKE STRUCTURE FOR SNOWMOBILE ENGINES

(75) Inventors: Hideshi Morii, Hamamatsu (JP); Yasuaki Yatagai, Hamamatsu (JP); Yutaka Sasaki, Hamamatsu (JP); Ken Shibano, Hamamatsu (JP); Hitoshi Matsumura, Hamamatsu (JP)

(73) Assignee: Suzuki Motor Corporation, Shizuoka (JP)

( * ) Notice: Subject to any disclaimer, the term of this patent is extended or adjusted under 35 U.S.C. 154(b) by 317 days.

(21) Appl. No.: 10/815,943

(22) Filed: Apr. 2, 2004

(65) Prior Publication Data

US 2004/0182623 A1 Sep. 23, 2004

Related U.S. Application Data

(63) Continuation of application No. 10/159,117, filed on Jun. 3, 2002, now Pat. No. 6,745,862.

(30) Foreign Application Priority Data

Jun. 1, 2001 (JP) .............................. 2001-166884
Aug. 28, 2001 (JP) .............................. 2001-257845

(51) Int. Cl.
   *B60K 13/00* (2006.01)
(52) U.S. Cl. ..................................... 180/69.1; 180/297
(58) Field of Classification Search .............. 180/69.1, 180/291, 297, 190, 196
   See application file for complete search history.

(56) References Cited

U.S. PATENT DOCUMENTS

| | | | |
|---|---|---|---|
| 3,776,354 A | 12/1973 | Duclo et al. | ................ 180/296 |
| 5,174,258 A | 12/1992 | Tamaka | |
| 6,510,912 B1 * | 1/2003 | Atsuumi | ..................... 180/69.1 |
| 6,561,297 B1 * | 5/2003 | Yatagai et al. | .............. 180/190 |
| 7,013,860 B1 * | 3/2006 | Takeuchi | ................ 123/196 R |
| 2002/0027029 A1 * | 3/2002 | Yatagai et al. | .............. 180/182 |
| 2002/0100631 A1 | 8/2002 | Nishijma | ..................... 180/312 |

FOREIGN PATENT DOCUMENTS

| | | |
|---|---|---|
| JP | 2000-238688 A | 9/2000 |
| JP | 2001-10582 A | 1/2001 |
| JP | P3156085 B2 | 2/2001 |
| JP | 2002364468 A | 12/2002 |
| JP | 2003041921 A | 2/2003 |
| JP | 2003065065 A | 3/2003 |

* cited by examiner

*Primary Examiner*—Kevin Hurley
(74) *Attorney, Agent, or Firm*—Nixon & Vanderhye, P.C.

(57) ABSTRACT

In a snowmobile, a four-cycle engine is mounted in such a manner that its crankshaft is arranged along the body width direction and the central axis of a cylinder(s) is tilted rearward by angle α with respect to the vertical direction of the body, forming a rear tilted engine. At least part of the engine intake system including an air cleaner box and throttle body, connected to the intake port(s) of the engine is accommodated in the space inside the topmost projected portion of the engine hood. Exhaust is led out to the muffler located in front of the cylinder(s) by the exhaust system connected to the exhaust port(s) at the front of the cylinder head. Further, the intake passage is arranged between the engine body and the steering post.

8 Claims, 10 Drawing Sheets

SNOWMOBILE EQUIPPED WITH A FOUR-CYCLE ENGINE AND INTAKE STRUCTURE FOR SNOWMOBILE ENGINES

This application is a continuation of U.S. patent application Ser. No. 10/159,117, filed Jun. 3, 2002, now U.S. Pat No. 6,745,862 the entire content of which is hereby incorporated by reference in this application.

BACKGROUND OF THE INVENTION (1) Field of the Invention

The present invention relates to a snowmobile equipped with a four-cycle engine, in particular relating to an intake structure of a snowmobile engine.

(2) Description of the Prior Art

Conventionally, most snow vehicles such as snowmobiles and the like use two-cycle engines, which are relatively simple in structure, light and compact and yet powerful. Recently, however, because of regulation of exhaust gas or aiming at improvement of fuel consumption, there is a trend toward employing four-cycle engines. In contrast to two-cycle engines, which are compact and high in power, four-cycle engines need a camshaft and oil lubrication, inevitably tending towards larger size.

Therefore, it is necessary to provide a contrived layout of the oil pan configuration, intake and exhaust systems and associated auxiliaries, to facilitate the body and engine hood of a snowmobile equipped with a four-cycle engine having a similar size to that of a two-cycle engine.

In general, in order to improve the maneuverability of a snowmobile, it is preferred that the engine should be set as low as the steering tie-rod so that the center of gravity of the vehicle with the engine mounted is positioned at a low position while the engine should be set as close to the steering post as possible so that the center of gravity will be set at the center of the body.

Now, consider a configuration where the engine of an existing two-cycle snowmobile is replaced with a four-cycle engine and the crank center of the four-cycle engine is set at the same position as that of the original two-cycle engine. In this case, since a four-cycle engine has an oil pan at its bottom, it has a greater height than the two-cycle engine. Therefore, if the engine is arranged with its cylinders set upright, in some cases the engine may interfere with the steering rod, or in other cases the cylinder head and throttle body may interfere with the engine hood.

Further, the two-cycle snowmobile engine needs a large capacity expansion chamber for improving the performance. This chamber is generally routed on the side opposite to the drive clutch and connected to the muffler. The reason the exhaust system is thus laid out can be attributed to the necessity of providing a space for routing and for adjusting the weight balance between the left and right. A flywheel magneto, the chamber and muffler are arranged on the side opposite to the clutch which is heavy.

Electronic and electric parts such as an engine control unit (ECU), capacitive discharge ignition (CDI) unit and the like are attached on the top of the air cleaner, to the chassis or the engine in order to avoid breakage from vibrations.

However, if these electronic and electric parts are disposed away from the engine, the wires have to be tied up or clamped which is unpreferable from the viewpoint of layout.

A model with a starter motor needs a battery for electric supply, and the battery is usually disposed away from the clutch and muffler. Therefore, it is some distance from the engine so the lead wires have to be routed and clamped.

If the exit of the muffler is arranged near the rider, the noise becomes too large and harsh to the ear. If the exit of the muffler is offset to one side, either left or right, the exhaust noise during travel differs between the left and right of the vehicle, causing a noise problem.

Further, since snowmobiles are used in cold areas, there is a fear that the breather hose for releasing the pressure inside the head cover may be frozen because oil mixed with water circulates through the breather hose. Once it is frozen, the pressure inside the head cover increases, causing sealing deficiencies and lowering the power. Moreover, since snowmobiles travel on undulating courses, there is a fear that oil may leak out from the breather as the body moves to and fro.

SUMMARY OF THE INVENTION

The present invention has been devised in view of the above prior art problems, it is therefore an object of the present invention to provide a snowmobile equipped with a four-cycle engine, in which the four-cycle engine can be mounted with its center of gravity at a position low enough without interference with the engine hood, and which is improved in travelling performance by setting the centroid of the engine close to the centroid of the snowmobile body and lowering the center of gravity.

It is another object of the present invention to provide a four-cycle engine which is reduced in exhaust noise therefrom.

It is a further object of the present invention to provide an intake structure for a snowmobile engine, which is able to prevent oil leakage when the snowmobile body is tilted and which is able to prevent freezing inside the intake passage.

In order to achieve the above objects, the present invention is configured as follows:

In accordance with the first aspect of the present invention, a snowmobile having a four-cycle engine mounted on a front body thereof and enclosed by an engine hood located in front of a seat is characterized in that the four-cycle engine is mounted in such a manner that the crankshaft is arranged along the body width direction and the central axis of a cylinder(s) is tilted rearward with respect to the vertical direction of the snowmobile body, forming a rear tilted engine; at least part of the engine intake system including an air cleaner box and throttle body, located over the engine and connected to the intake port(s) at the rear part of the cylinder head is accommodated in the topmost space of the engine hood; and exhaust is led out to the front of the cylinder(s) by an exhaust system connected to the exhaust port(s) of the front part of the cylinder head.

In accordance with the second aspect of the present invention, the snowmobile equipped with a four-cycle engine, having the above first feature is characterized in that the engine hood has an upward projected portion formed at top thereof, a headlight is disposed at the front of the projected portion and an instrument panel for indicating the condition of the vehicle at the rear of the projected portion, and at least part of the intake system is accommodated in the space sandwiched between the headlight and instrument panel in the projected portion.

In accordance with the third aspect of the present invention, the snowmobile equipped with a four-cycle engine, having the above first feature is characterized in that the exhaust system includes an exhaust manifold connected to the exhaust port(s) at the front of the cylinder head and an exhaust muffler located in front of the engine and connected to the exit of the exhaust manifold by an exhaust pipe, both being arranged inside the engine hood, and the exhaust system further has an exhaust lead path from the muffler, with an opening formed in the body bottom at the center with respect to the body width so that exhaust will be discharged from the opening to the outside of the snowmobile body.

In accordance with the fourth aspect of the present invention, the snowmobile equipped with a four-cycle engine, having the above third feature is characterized in that the muffler is arranged at a level lower than the engine cylinder(s) and the exhaust pipe from the exhaust manifold is extended frontwards and downwards to the muffler.

In accordance with the fifth aspect of the present invention, the snowmobile equipped with a four-cycle engine, having the above third feature is characterized in that the muffler is of an overal cylindrical shape with its cylinder axis directed along the body width, and exhaust from the engine is led into the muffler via an exhaust pipe that is connected to the muffler at one side with respect to the body width.

In accordance with the sixth aspect of the present invention, the snowmobile equipped with a four-cycle engine, having the above first feature is characterized in that the four-cycle engine is arranged in the engine hood so that the lengthwise center of the crankshaft is off-centered to one side with respect to the center of the body width.

In accordance with the seventh aspect of the present invention, the snowmobile equipped with a four-cycle engine, having the above sixth feature is characterized in that, in the engine hood, a clutch mechanism is arranged on one side, with respect to the body width, of the engine while a battery is disposed on the other side with respect to the body width.

In accordance with the eighth aspect of the present invention, the snowmobile equipped with a four-cycle engine, having the above seventh feature is characterized in that electrical equipment is attached to a battery holder for mounting the battery.

In accordance with the ninth aspect of the present invention, an intake structure of an engine for a snowmobile wherein a four-cycle engine positioned with its cylinder head at the upper side is provided at the approximate center of an engine room formed in the front body thereof, a steering post equipped with a steering device at the top end thereof for maneuvering the snowmobile is set up in the engine room so that it stands with its steering device side tilted to the rear, is characterized in that the engine is arranged in front of the steering post and an intake passage is disposed between the steering post and the engine body.

In accordance with the tenth aspect of the present invention, the intake structure of a snowmobile engine, having the above ninth feature is characterized in that an intake manifold constituting part of the intake passage is arranged at the side of the steering post in such a manner that air is supplied to the manifold by downdraft ventilation.

In accordance with the eleventh aspect of the present invention, the intake structure of a snowmobile engine, having the above ninth feature is characterized in that the front body includes an instrument panel at the top and an engine hood in front of the instrument panel, and the engine hood is formed so that it starts at a position stepped down a degree from the front end of the instrument panel toward the front end while a headlight facing outwards and frontwards is arranged at the stepped portion between the engine hood and instrument panel, and a carburetor constituting part of the intake passage is disposed in a space behind the headlight under the instrument panel inside the engine room.

In accordance with the twelfth aspect of the present invention, the intake structure of a snowmobile engine, having the above ninth feature is characterized in that the engine is arranged so that the axis of its crankshaft therein is oriented approximately parallel to the body width direction while the carburetor is positioned at a level higher than the cylinder head.

In accordance with the thirteenth aspect of the present invention, the intake structure of a snowmobile engine, having the above ninth feature is characterized in that the engine includes an air cleaner box disposed at the rear of a head cover that covers the cylinder head and a first breather hose that connects the interior of the head cover with the interior of the air cleaner box, and the first breather hose is connected at one end to the rear side of the head cover on the drive-clutch side and is extended approximately linearly, and parallel to, the axial direction of the crankshaft, from the drive clutch side to the opposite side and bent perpendicularly, when viewed from top, and further extended and connected at the other end to the air cleaner box.

In accordance with the fourteenth aspect of the present invention, the intake structure of a snowmobile engine, having the above thirteenth feature is characterized in that, when the snowmobile body is in its horizontal position, the first breather hose is positioned so that a joint to head cover is lower than another joint to the air cleaner box.

In accordance with the fifteenth aspect of the present invention, the intake structure of a snowmobile engine, having the above ninth feature is characterized in that the engine includes a second breather hose for connecting the interior of the air cleaner box to the outside of the snowmobile body, and the second breather hose is connected at one end to the bottom of the air cleaner box and the other end is arranged penetrating through the bottom of the front body and opening to the outside, whereby the water inside the air cleaner box is drained to the outside of the body.

According to the present invention, since the four-cycle engine is tilted rearwards so that part of the intake system over the engine can be accommodated on the rear side of the headlight inside the topmost portion of the engine hood, it is possible to avoid its interference with the engine hood and headlight and yet markedly reduce the full height of the engine compared to the configuration where the engine is mounted in its upright position. Further, the rear tilt arrangement of the four-cycle engine in the engine hood of the front body makes the center of gravity of the engine close to the center of the body and also lowers the center of gravity of the snowmobile because of the lower positioning of the cylinder head, whereby it is possible to improve the maneuverability and travelling performance of the snowmobile. Further, the rear tilt arrangement of the engine creates a more space in front of the engine so that exhaust pipes and other components can be laid out with more flexibility, hence it is possible to further reduce the height of the engine hood. Since, if the intake system connected to the rear part of the engine is arranged over the engine the elements of the intake system can be arranged behind the headlight in the topmost portion of the engine hood, it is possible to improve the space efficiency without the need of modification or reconstruction such as increasing the height of the engine hood.

Further, it is possible to make use of the empty space behind the headlight at the topmost portion of the engine hood, in which the headlight and instrument panel are disposed, and to interpose part of the intake system in an efficient manner, whereby it is possible to make the shape of the engine hood short in its height.

In addition, exhaust can be discharged from the body bottom at the center with respect to the body width. That is, since exhaust noise from the body bottom can be dispersed to both sides and since the exhaust opening is located in the front body, the noise arises at a position away from the rider so that the exhaust noise will not be very harsh to the rider while travelling. Further, since the opening is located at the center of the body width, the exhaust noise during travelling will scatter equally to both sides, and since the opening is directed downwards, extra muffling effects from the snow surface and from the snow scattered by the steering ski-runners can be expected.

The layout of the exhaust pipe from the engine up to the muffler is inclined downward as it goes frontwards. That is, this arrangement compliments the engine hood configuration which lowers as it goes frontward to improve the aerodynamic performance.

It is also possible to mount the muffler within the engine hood without the necessity of taking a large space in the longitudinal direction.

Further, it is preferred that the four-cycle engine is mounted in the engine hood with the lengthwise center of the crankshaft off-centered to one side with respect to the center of the body width direction.

Since the clutch mechanism is arranged at one side of the engine and a battery is arranged at the other side in the engine hood, the weight balance with respect to the width direction can be easily adjusted.

It is also possible to adjust the weight balance in a more exact manner, by attaching electrical equipment such as an ECU, CDI unit to the battery holder. Further, since electrical equipment can be laid out next to the engine, it is possible to shorten their lead wires from the engine, hence simplify the routing of wires.

According to the present invention, the following effects can be further obtained.

Since, in a snowmobile, the engine is arranged in front of the steering post and an intake passage including an intake manifold and the like is disposed between the steering post and the engine body, it is possible to set the engine at the center of the snowmobile body.

Since air can be supplied to the intake manifold by downdraft ventilation by the arrangement of the intake passage at a position higher than the engine body, it is possible to receive air without being blocked by the engine and hence improve the air-cooling effect of the flow of air during travel. Further, since the intake manifold is arranged at the side of the steering post, it is possible to achieve a space-saving engine layout.

Further, the front body includes an instrument panel at the top thereof and an engine hood in front of the instrument panel, and the engine hood is formed so that it starts at a position stepped down a degree from the front end of the instrument panel toward the front end while a headlight facing outwards and frontwards is arranged at the stepped portion between the engine hood and instrument panel, and a throttle body as a carburetor is disposed in a space behind the headlight under the instrument panel inside the engine room. By this arrangement, it is possible to design the engine hood without any restriction of the engine height.

Since the engine is arranged with the axis of its crankshaft therein set approximately parallel to the body width direction while the throttle body is arranged at a level higher than the cylinder head, it is possible to receive air without being blocked by the engine and hence improve the air-cooling effect of the flow of air during travel.

Since the engine has an air cleaner box disposed at the rear of a head cover that covers the cylinder head and a first breather hose that connects the interior of the head cover with the interior of the air cleaner box, it is possible to return oil mist, water, etc., to the air cleaner box. Further, since the first breather hose is connected at one end to the rear side of the head cover on the drive-clutch side and is extended approximately linearly, and parallel to, the axial direction of the crankshaft, from the drive clutch side to the opposite side and bent perpendicularly, when viewed from top, and further extended and connected at the other end to the air cleaner box, no oil or water will stagnate within the first breather hose, so it is possible to prevent the freezing inside the intake passage.

Since, when the snowmobile body is in its horizontal position, the first breather hose is positioned so that its joint to the head cover is lower than its joint to the air cleaner box, there is no risk of oil leaking if the body is tilted during travelling or during stopping.

Further, since the engine has a second breather hose which connects the interior of the air cleaner box to the outside of the body, there is no risk of water stagnating within the intake passage including an air filter, intake pipe, carburetor and the like, hence it is possible to prevent freezing inside the intake passage. Further, since the second breather hose is connected at one end to the bottom of the air cleaner box while the other end is arranged penetrating through the bottom of the front body and opening to the outside, the water inside the air cleaner box can be drained to the outside of the snowmobile body, hence it is possible to prevent freezing inside the intake passage.

DESCRIPTION OF THE PREFERRED EMBODIMENTS

The embodiment of the present invention will hereinafter be described in detail with reference to the accompanying drawings.

Figure 1:
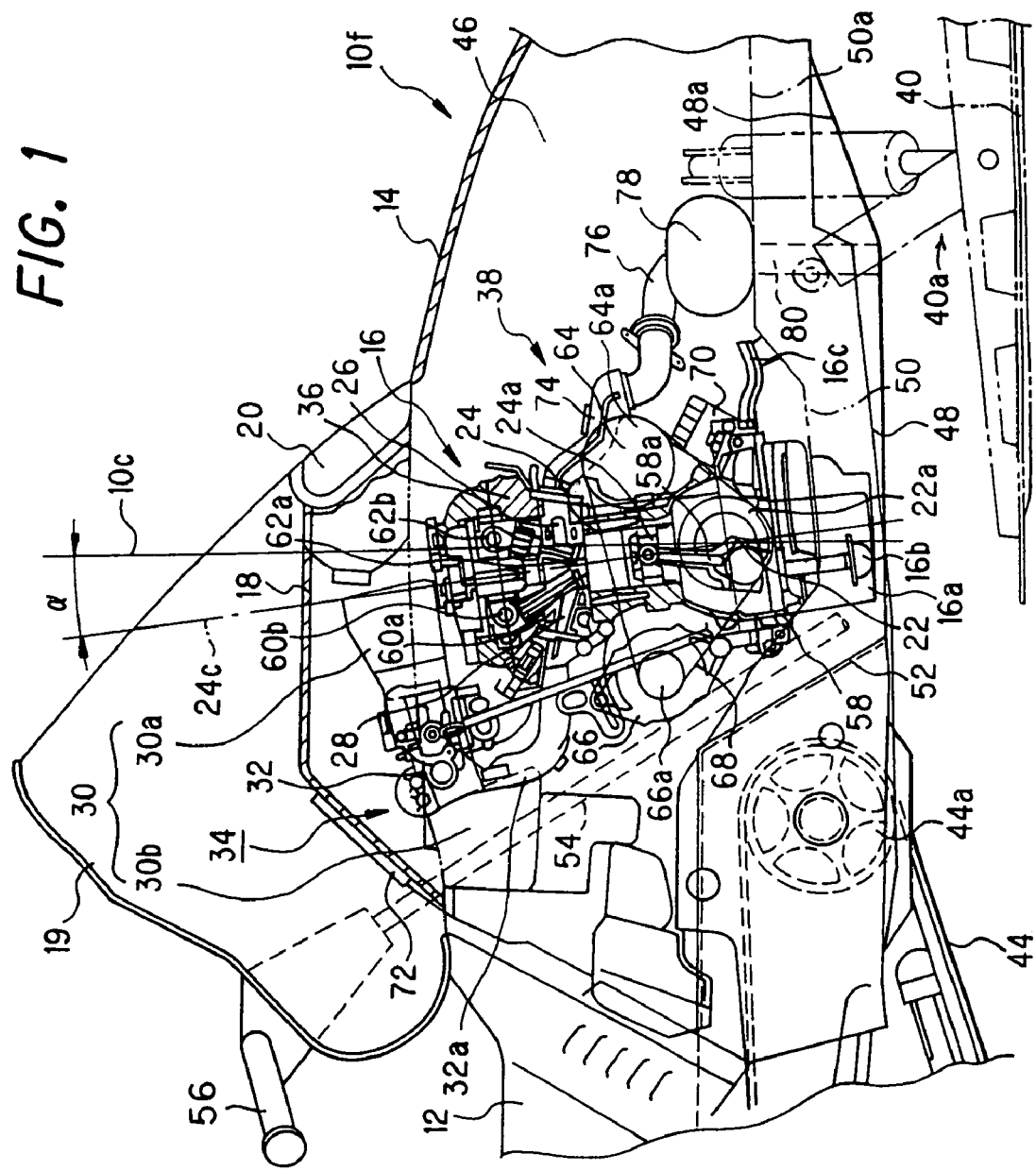
FIG. 1 is an enlarged illustrative side view showing the front part of a snowmobile equipped with a four-cycle engine which is applied to the embodiment of the present invention.
Figure 2:
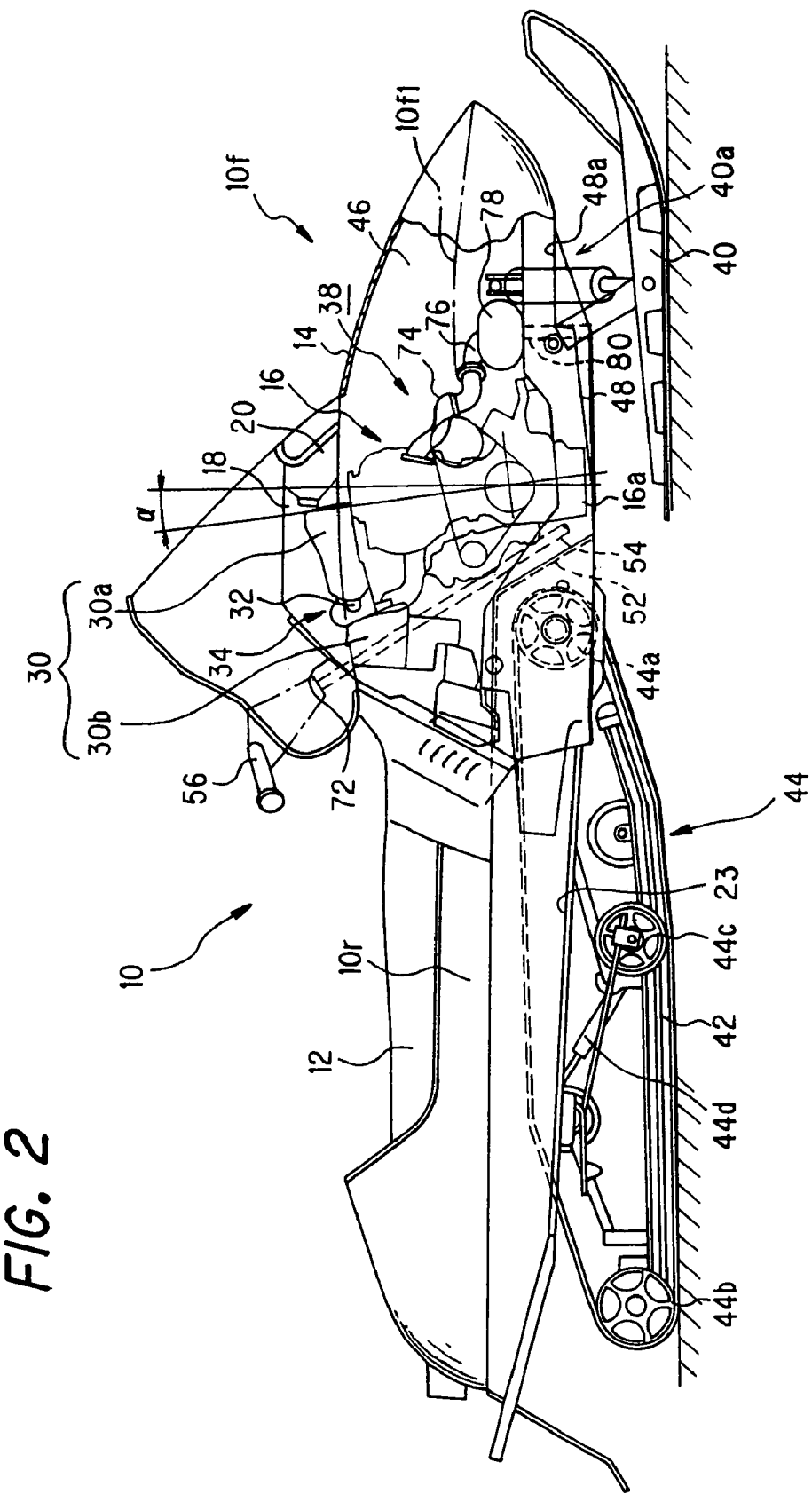
FIG. 2 is an illustrative side view showing the overall configuration of the same snowmobile.
Figure 3:
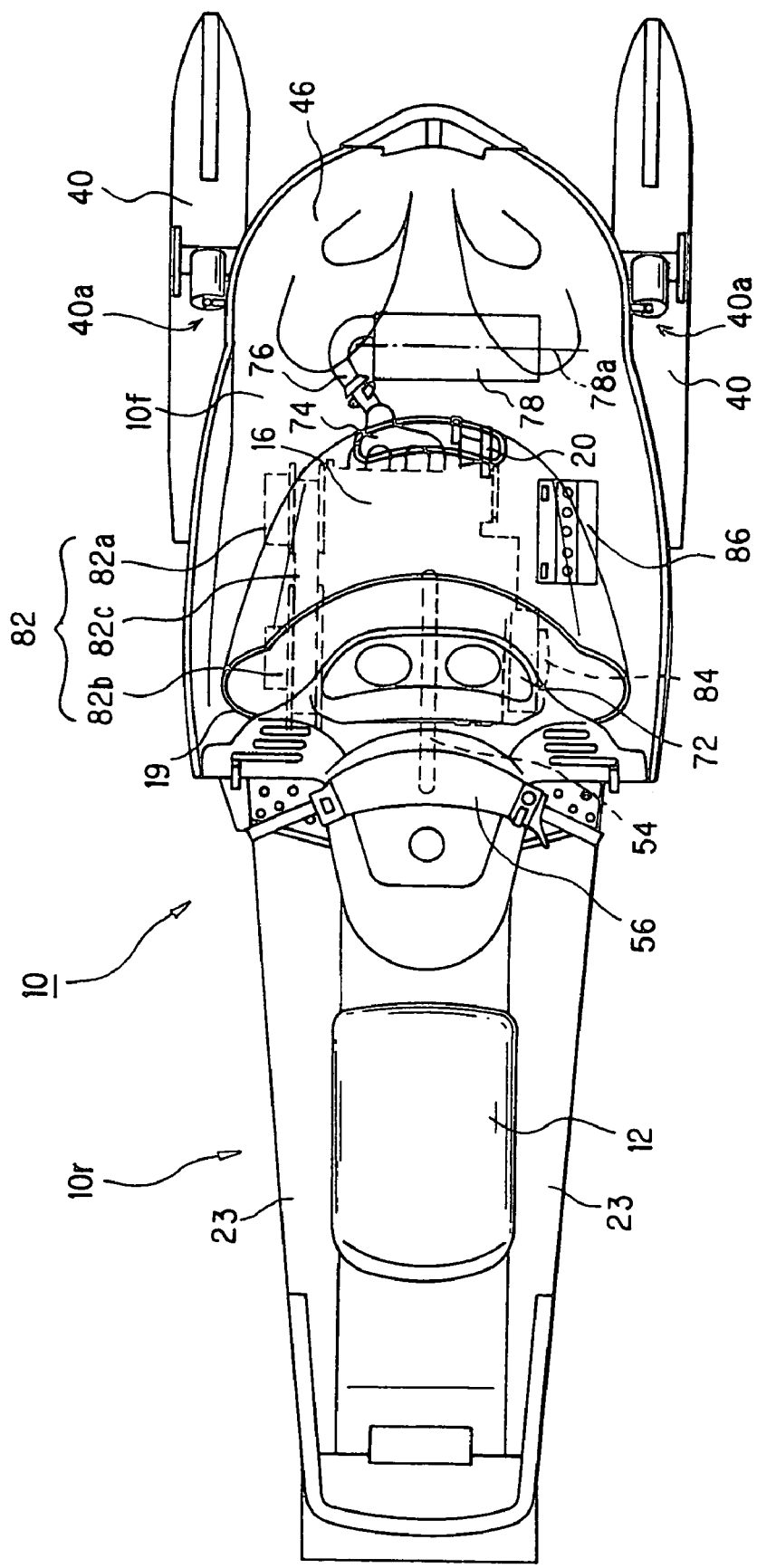
FIG. 3 is an illustrative plan view showing the overall configuration of the same snowmobile.
Figure 4:
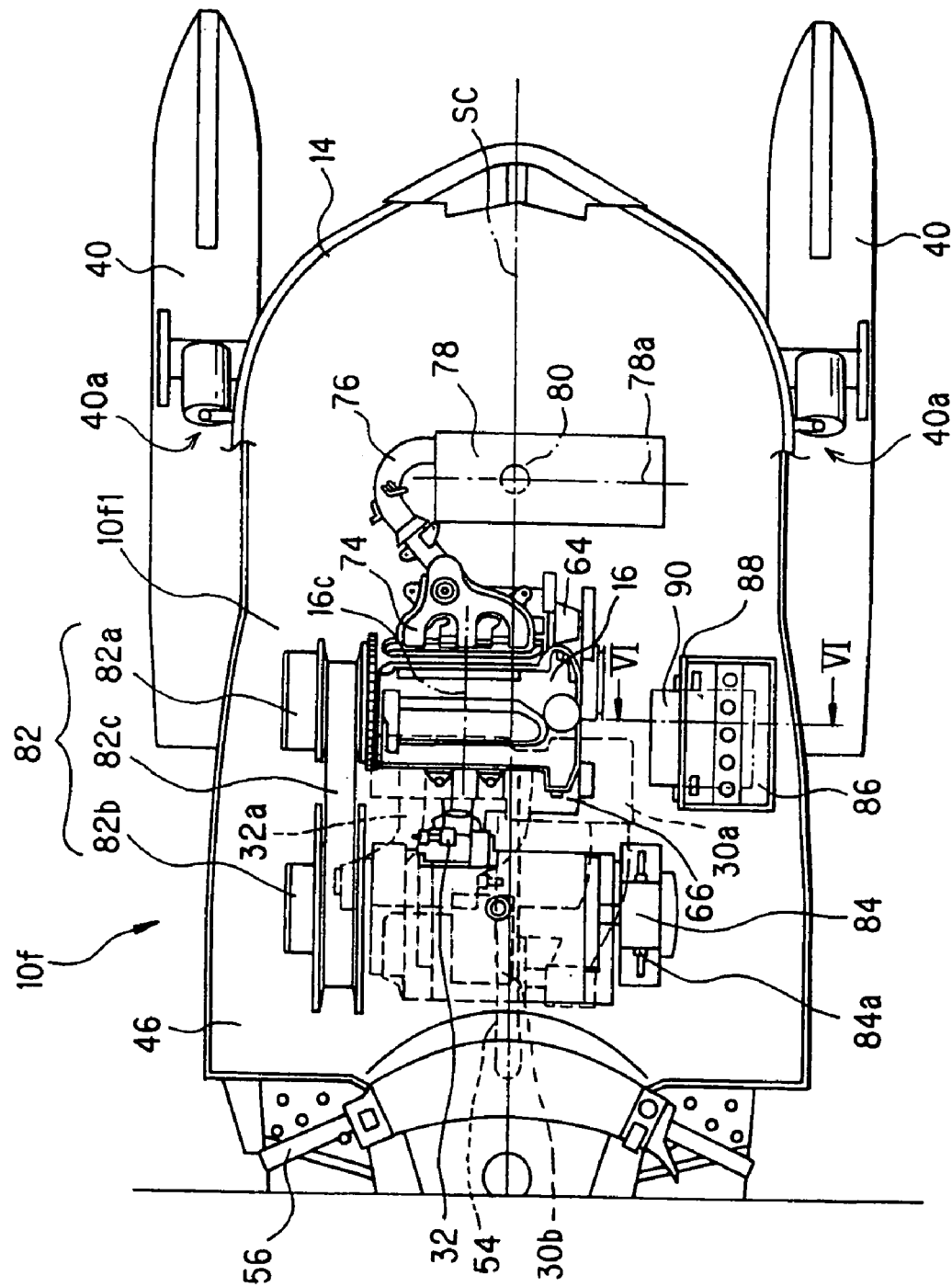
FIG. 4 is an enlarged illustrative view showing the detail of FIG. 3.
Figure 5:
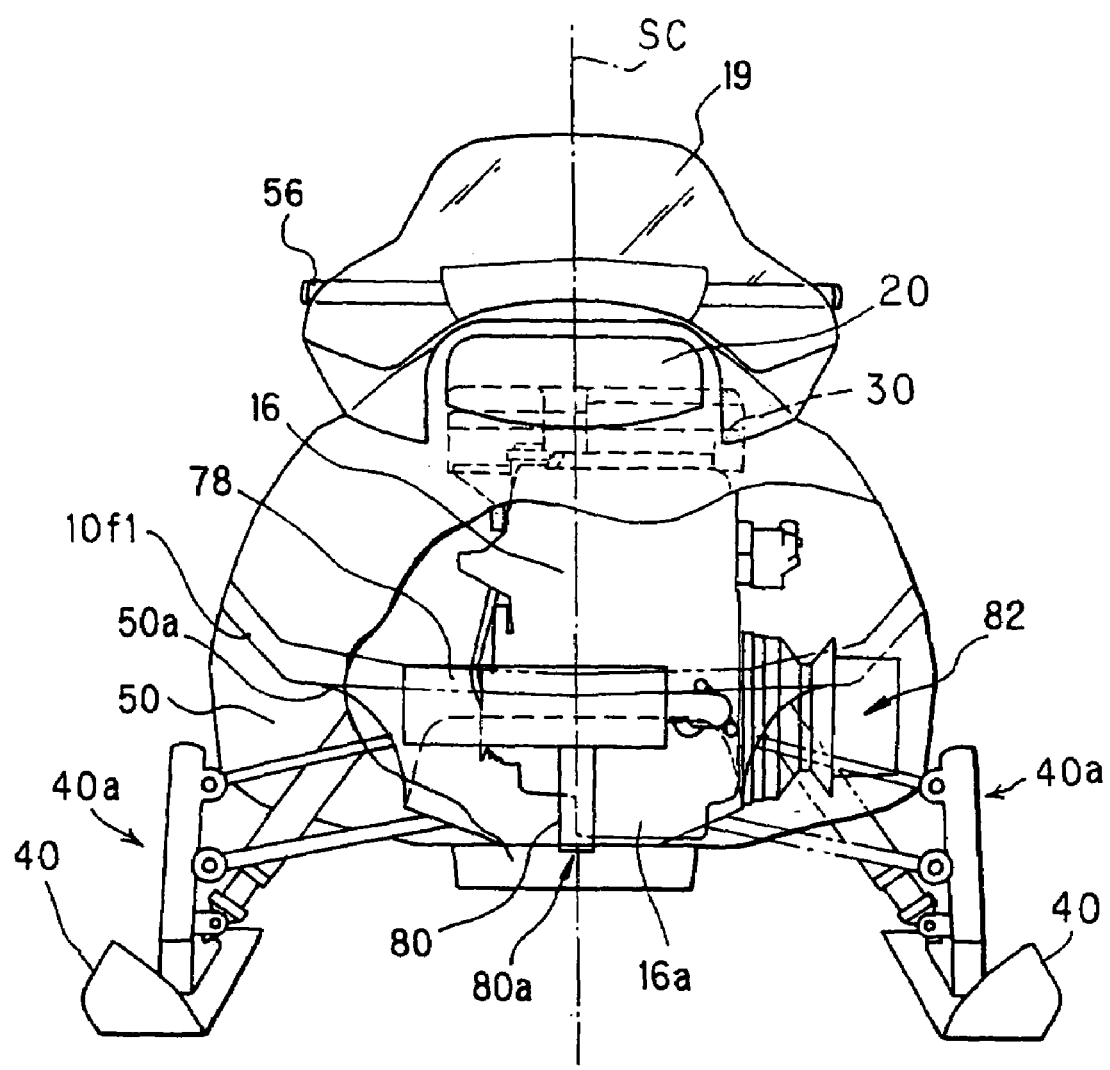
FIG. 5 is an illustrative front view showing a snowmobile.
Figure 6A:
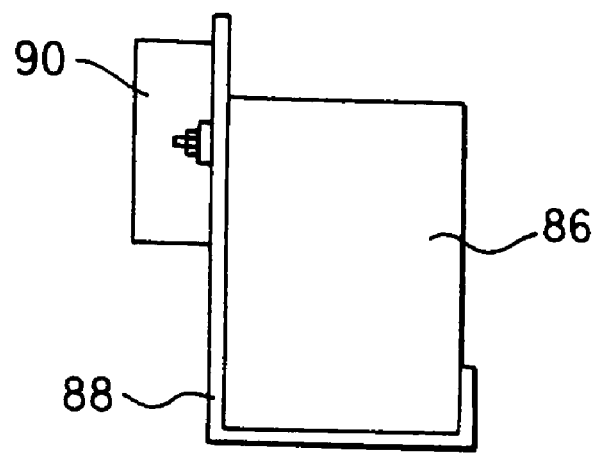
FIGS. 6A and 6B are illustrative layout views of a battery, cut along a VI—VI plane in FIG. 4.
Figure 6B:
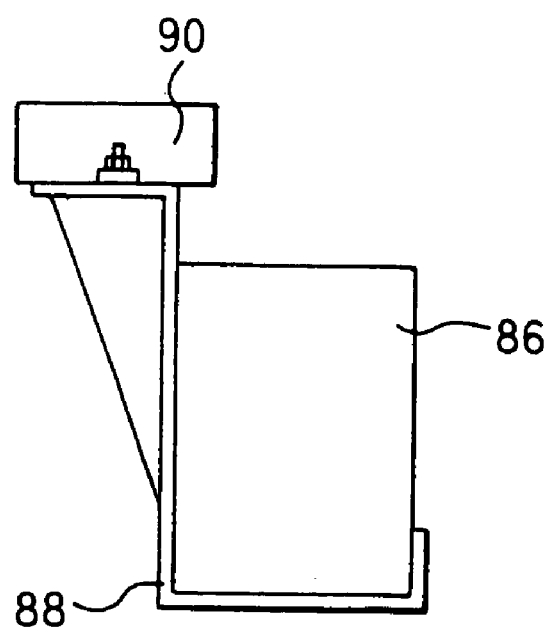
Figure 7A:
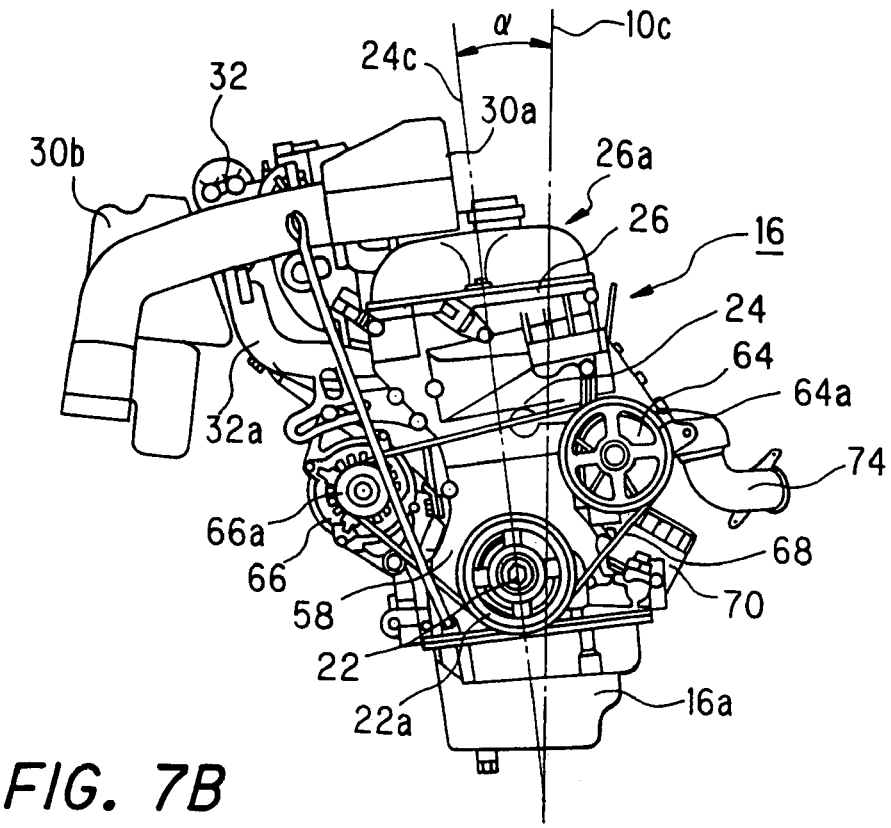
FIGS. 7A and 7B are external side view and front view, respectively, showing the four-cycle engine.
Figure 7B:
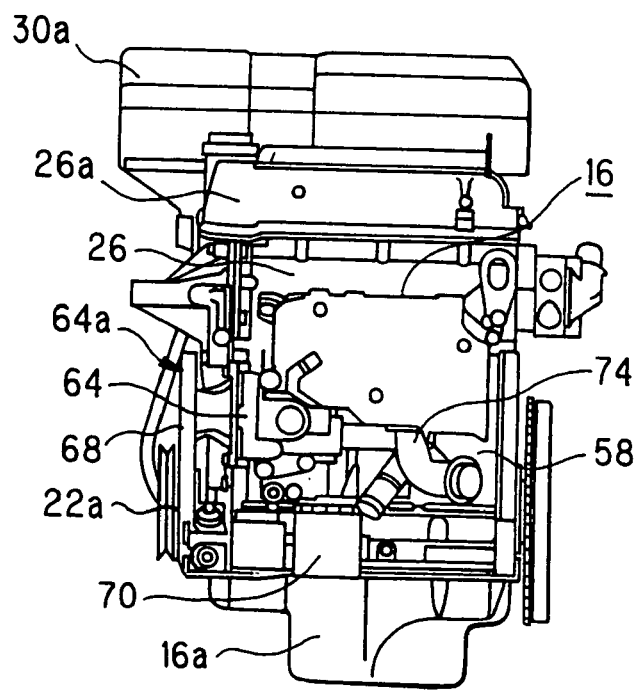
Figure 8:
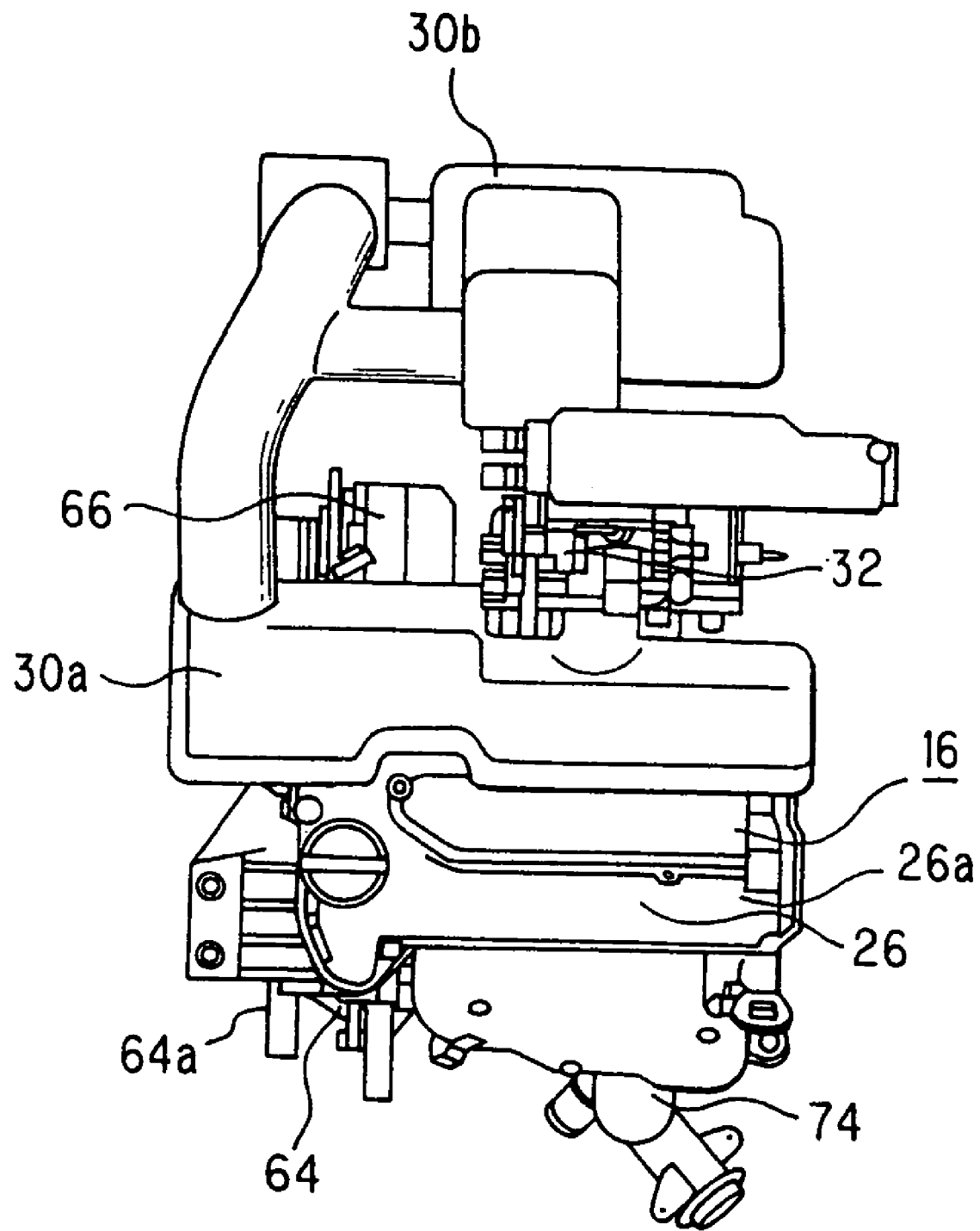
FIG. 8 is a plan view showing a four-cycle engine.

FIG. 1 is an enlarged illustrative side view showing the front part of a snowmobile equipped with a four-cycle engine which is applied to the embodiment of the present invention; FIG. 2 is an illustrative side view showing the overall configuration of the same snowmobile; FIG. 3 is an illustrative plan view showing the overall configuration of the same snowmobile; FIG. 4 is an enlarged illustrative view showing the detail of FIG. 3; FIG. 5 is an illustrative front view showing a snowmobile; FIGS. 6A and 6B are illustrative layout views of a battery, cut along a VI—VI plane in FIG. 4; FIGS. 7A and 7B are external side view and front view, respectively, showing the four-cycle engine; and FIG. 8 is a plan view showing a four-cycle engine.

As shown in FIG. 1 to 4, the snowmobile of the embodiment is one which includes a three-cylinder (one example of a multi-cylinder) four-cycle engine 16 in an engine hood 14 in front of a rider's seat 12 or located in the front body, designated at 10f of a body 10. The engine hood 14 has a headlight 20 formed on the front side of the topmost part thereof (a projected portion 18 that projects on the top in this embodiment). The four-cycle engine 16 is mounted in such a manner that its crankshaft 22 is arranged along the body width direction while the central axis 24c of cylinders 24 is tilted rearward by angle α with respect to the vertical direction 10c of the body, forming a rear tilted engine. An intake system 34 of engine 16 includes an air cleaner box 30 and throttle body 32 connected to intake ports 28 at the rear of a cylinder head 26 of the engine 16, and at least part of intake system 34 (in this embodiment, a front part 30a of air cleaner box 30 and the upper part of throttle body 32) is accommodated in the rear space of headlight 20 inside the projected portion 18 at the top of the engine hood 14. An exhaust system 38 is extended from exhaust ports 36 at the front of cylinder head 26 so that exhaust is led forwards to the front of cylinders 24.

Now, the configuration of this snowmobile will be described in further detail.

As shown in FIGS. 2 and 3, the snowmobile according to the embodiment has a pair of steerable ski-runners 40, left and right, at the bottom of front body 10f of vehicle body 10 which extends in the front-to-rear direction. These steerable ski-runners 40 are rotatably mounted so that they turn left and right. Arranged under the rear body, designated at 10r, on which the aforementioned rider's seat 12 is mounted, is a crawler 44 which circulates a track belt 42. This crawler 44 comprises a drive wheel 44a arranged at the front end of rear body 10r, an idle wheel 44b arranged at its rear end and a multiple number of middle wheels 44c, a suspension mechanism 44d for supporting and cushioning these items and track belt 42 wound around these wheels and driven circulatively. Further, steps 23 are provided at a lower level on both sides, with respect to the body width direction, of seat 12.

The body 10 has a monocoque frame configuration. The front body (engine mount frame) 10f with four-cycle engine 16 mounted thereon is so shaped that it gradually becomes narrower, when viewed from its top, having, overall, a ship's bottom-like configuration with a top opening 10f1, which is enclosed by engine hood 14, thereby forming an engine room 46 therein. The boundary edge of the top opening 10f1 is formed by a lightly waving curve.

In front body 10f, as mainly shown in FIG. 2, the inner bottom surface of engine room 46 is formed so that its center (to be called the principal portion) 48 with respect to the body width direction and with respect to the front-to-rear direction becomes the lowest. An engine oil pan 16a is positioned in the adjoining area of the most lowest point of the principal portion 48 and over principal portion 48 while four-cycle engine 16 is fixed and suspended at its front lower point in a floating manner by a bracket 16c.

The center of the inner bottom of engine room 46 with respect to the body width direction is gently inclined upward forming a front portion 48a of the principal portion 48. The bottom of engine room 46 is raised upwards, from the positions on both the left and right sides of principal portion 48 to the front (or depressed downwards in view of body front 10f), forming ski-runner housings 50, so that ski runners 40 will not interfere with the body when steerable ski-runners 40 are rotated or make cushioning actions. The front part 50a of each ski-runner house 50 is depressed more upwards than the vicinity of principal portion 48 so as to accommodate the suspension mechanism and steering mechanism 40a of each ski-runner 40 (see FIG. 4). The bottom surface on the rear side of principal portion 48 is projected more upwards than principal portion 48, forming a crawler house 52 for accommodating the front part (near drive wheels 44a) of the crawler 44.

A steering shaft (also called steering post) 54 is projectively provided so as to be somewhat inclined rearwards in front of seat 12 in the rear part of engine hood 14. A pair of steering handlebars 56 for steering control are attached at the top end of this steering shaft 54. The bottom end of steering shaft 54 is rotatably supported at a position adjoining the crawler house 52 by the body and is coupled with an unillustrated linkage so that the steering force is transmitted to steering mechanism 40a for turning ski-runners 40 to the left and right for maneuvering.

The rear tilted four-cycle engine 16 mounted in engine room 46 in engine hood 14 has, in its lower part, oil pan 16a at the bottom of crankcase 58 as shown in FIGS. 1 to 8. An oil strainer 16b is arranged at the oil suctioning port in oil pan 16a. Each piston 24a moves up and down in cylinder 24 above the engine crankcase 58 and the reciprocating movement is converted into the rotational movement of crankshaft 22 via each connecting rod 58a. Cylinder head 26 arranged on the top of cylinders 24 has intake and exhaust valves 60a and 62b for opening and shutting corresponding intake and exhaust ports 28 and 36 which are connected to the combustion chambers of cylinders 24 and their valve gear mechanisms 60b and 62a. In this way, the engine of this embodiment has a double-overhead cam type four-cycle engine configuration.

A water pump 64 is arranged above crankcase 58 and in front of engine cylinders 24 while an alternator 66 is disposed behind the rear of the engine cylinders. Driven pulleys 64a and 66a are respectively attached. A timing belt 68 is wound around these pulleys and a drive pulley 22a attached to crankshaft 22 outside crankcase 58 so that the water pump and alternator can be driven by the crankshaft. The water pump 64, alternator 66 and crankshaft 22 are positioned in an inverted triangular manner when viewed from their side, the upper path of timing belt 68 being laid out so as to be approximately parallel to the abutment between cylinder head 26 and cylinders 24.

An approximately cylindrical oil filter 70 is arranged in front of crankcase 58 so as to stand with its center axis oriented upwards and frontwards. The top position of this oil filter 70 approximately corresponds to the lower end of water pump 64, when viewed from the side.

Projected portion 18 that projects upwards is formed on the topmost portion of the engine hood 14. The headlight 20 unit is arranged on the front side of this projected portion 18 while an instrument panel 72 for indicating the vehicle's condition is disposed on the rear side of projected portion 18. At least part of intake system 34 is accommodated in the space 74 enclosed between headlight 20 and instrument panel 72 of projected portion 18. A fairing (windshield) 19 opening rearwards for protecting the rider from the wind is formed so as to cover the projected portion 18 and be wider than the width of steering handle bars 56 and is disposed over engine hood 14.

In intake system 34 of the embodiment, air cleaner box 30 is composed of two parts (front box 30a and rear box 30b) arranged in front of and behind throttle body 32, the upper part of throttle 32 and front box 30a lap the projected portion 18 when viewed from the side. Front box 30a is located over cylinder head 26 (over cylinder head cover 26a) lapping engine 16 when viewed from the top. Rear box 30b is disposed in a space over a drive sprocket shaft 84. In this intake system 34, intake air flows from rear box 30b to front box 30a so that air-fuel mixture flows frontwards and downwards from throttle body 32 to intake pipe 32a (intake manifold) and intake ports 28 of engine 16.

The exhaust system 38 is comprised, as shown in FIGS. 1, 4 and 5, of an exhaust manifold 74 connected to exhaust ports 36 at the front of cylinder head 26 and an exhaust muffler 78 disposed in front of engine 16 and connected to the exit side of exhaust manifold 74 via an exhaust pipe 76. All these exhaust elements are laid out inside engine room 46 and covered by engine hood 14. In this embodiment, the muffler 78 is located over the front portion 48a of the principal portion. An exhaust lead pipe 80 from muffler 78 is provided penetrating through the bottom of body 10 with its opening 80a located at the center (indicated by SC) with respect to the body width direction at the bottom of body 10 so that exhaust from engine 16 is discharged through the opening 80a to the outside or towards the ground.

Muffler 78 is located below the engine cylinders 24 so that exhaust pipe 76 connected to exhaust manifold 74 is extended frontwards and downwards to muffler 78. Exhaust manifold 74 has multiple entrance apertures connected to multiple (three) exhaust ports 36 (one for each of three cylinders in this embodiment) of four-cycle engine 16 and has an integrated exit connected to exhaust pipe 76. This integrated part lies frontwards and downwards.

The muffler 78 is formed of an overal cylindrical shape with its cylinder axis 78a directed along the body width direction. Connected to one side with respect to the body width direction (on the left side of the body in this embodiment) is the exit side of exhaust pipe 76 which is curved in an approximate C-shape. Thus, exhaust from four-cycle engine 16 is led through pipe 76 into muffler 78. The muffler 78 is off-centered to the other side with respect to the body width direction (to the right side of the body in this embodiment), so that exhaust pipe 76 can be laid out so as to be kept apart from the inner wall of engine room 46.

In engine hood 14, four-cycle engine 16 is arranged so that the lengthwise center, designated at 16C, of crankshaft 22 is off-centered to one side with respect to the center SC of the body width direction (see FIG. 4). Further, in engine hood 14, a clutch mechanism 82 is arranged on one side (on the left side of the body) of four-cycle engine 16 while a battery 86 is disposed on the other side with respect to the body width direction. Clutch mechanism 82 is comprised of a drive clutch pulley 82a fitted on the output end of the engine crankshaft, a drive clutch pulley 82b fitted on a crawler drive sprocket shaft 84 on the side opposite to a sprocket 84a and a V-belt 82c having a V-shaped section and also serves as a V-belt speed change gear.

It is preferred that electrical equipment 90 such as an ECU, CDI unit and the like is attached to the battery holder, designated at 88, for accommodating and fastening battery 86 without its rattling. As shown in FIGS. 4 and 6A and 6B, battery holder 88 is formed of a metal mount having a section of L-shape. As shown in FIG. 6A, electrical equipment 90 and battery 86 may be fitted back to back or electrical equipment 90 may be fitted above battery 86 as shown in FIG. 6B.

As has been described heretofore, according to the present invention, since four-cycle engine 16 is tilted rearwards so that part of the intake system over engine 16 can be accommodated on the rear side of headlight 20 inside the topmost portion(projected portion 18) of engine hood 14, it is possible to avoid its interference with engine hood 14 and headlight 20 and yet markedly reduce the full height of the engine compared to the configuration where the engine is mounted in its upright position. Further, the rear tilt arrangement of four-cycle engine 16 in engine hood 14 of the front body makes the center of gravity of engine 16 close to the center of the body and also lowers the center of gravity of the snowmobile because of the lower positioning of cylinder head 26, whereby it is possible to improve the maneuverability and travelling performance of the snowmobile. Further, the rear tilt arrangement of engine 16 creates more space in front of the engine so that exhaust pipes and other components can be laid out with more flexibility, hence it is possible to further reduce the height of engine hood 14. Since, if intake system 34 connected to the rear part of the engine is arranged over engine 16 the elements of the intake system can be arranged behind headlight 20 in the topmost portion of engine hood 14, it is possible to improve the space efficiency without the need of modification or reconstruction such as increasing the height of the engine hood.

In the above arrangement, upward projected portion 18 is formed at the topmost portion of engine hood 14 and headlight 20 and instrument panel 72 for indicating the vehicle's condition are arranged at the front and rear of the projected portion 18, respectively, so that it is possible to insert at least part of intake system 34 into the space sandwiched between headlight 20 and instrument panel 72 inside the projected portion 18. In this way, it is possible to make use of the empty space behind headlight 20 at the topmost portion of engine hood 14, in which headlight 20 and instrument panel 72 are disposed, and to interpose part of the intake system in an efficient manner, whereby it is possible to make the shape of engine hood 14 short in its height.

Exhaust system 38 is constructed of exhaust manifold 74 connected to exhaust ports 36 at the front of cylinder head 26 and exhaust muffler 78 arranged in front of the engine and connected to the exit side of exhaust manifold 74 by exhaust pipe 76, all being accommodated inside engine hood 14 while opening 80a of exhaust lead pipe 80 from the muffler 78 is arranged in the body bottom at the center with respect to the body width direction so that exhaust can be discharged outside from the opening 80a. Accordingly, exhaust can be discharged from the body bottom at the center with respect to the body width direction. That is, since exhaust noise can be dispersed from the body bottom to both sides and since the exhaust opening is located in the front body, the noise arises at a position away from the rider so that the exhaust noise will not be very harsh to the rider while travelling. Further, since the opening is located at the center of the body width, the exhaust noise during travelling will scatter equally to both sides, and since the opening is directed downwards, extra muffling effects from the snow surface and from the snow scattered by the steering ski-runners can be expected.

Further, since muffler 78 is located below engine cylinders 24 and exhaust pipe 76, connected to exhaust manifold 74, is extended frontwards and downwards up to muffler 78, the layout of exhaust pipe 76 from engine 16 up to muffler 78 is inclined downward as it goes frontwards. That is, this arrangement compliments the engine hood 14 configuration which lowers as it goes frontward to improve the aerodynamic performance.

Since muffler 78, formed of an approximate cylindrical shape, is arranged with its cylindrical axis set along the body width direction while exhaust from engine 16 is led into muffler 78 by way of exhaust pipe 76 that is connected to one side of the muffler with respect to the body width direction, it is possible to mount muffler 78 within engine hood 14 without the necessity of taking a large space in the longitudinal direction.

Further, four-cycle engine 16 is mounted in engine hood 14 with the lengthwise center of the crankshaft off-centered to one side with respect to the body width direction while battery 86 is put on the other side, so as to improve the space efficiency.

Since clutch mechanism 82 is arranged at one side of engine 16 and battery 86 is arranged at the other side in engine hood 14, the weight balance with respect to the body width direction can be easily adjusted.

Since electrical equipment is attached to battery holder 88 for holding battery 86, it is possible to adjust the weight balance in a more exact manner, by attaching electrical equipment 90 such as an ECU, CDI unit to battery holder 88. Further, since electrical equipment can be laid out next to engine 16, it is possible to shorten their lead wires from engine 16, hence simplify the routing of wires.

Next, another embodiment of the present invention will be explained which relates to an intake structure of a snowmobile engine wherein the engine can be mounted at the center of the vehicle without any interference with the engine hood and no oil leakage will occur if the body is tilted so that it is possible to prevent freezing within the intake passage.

Figure 9:
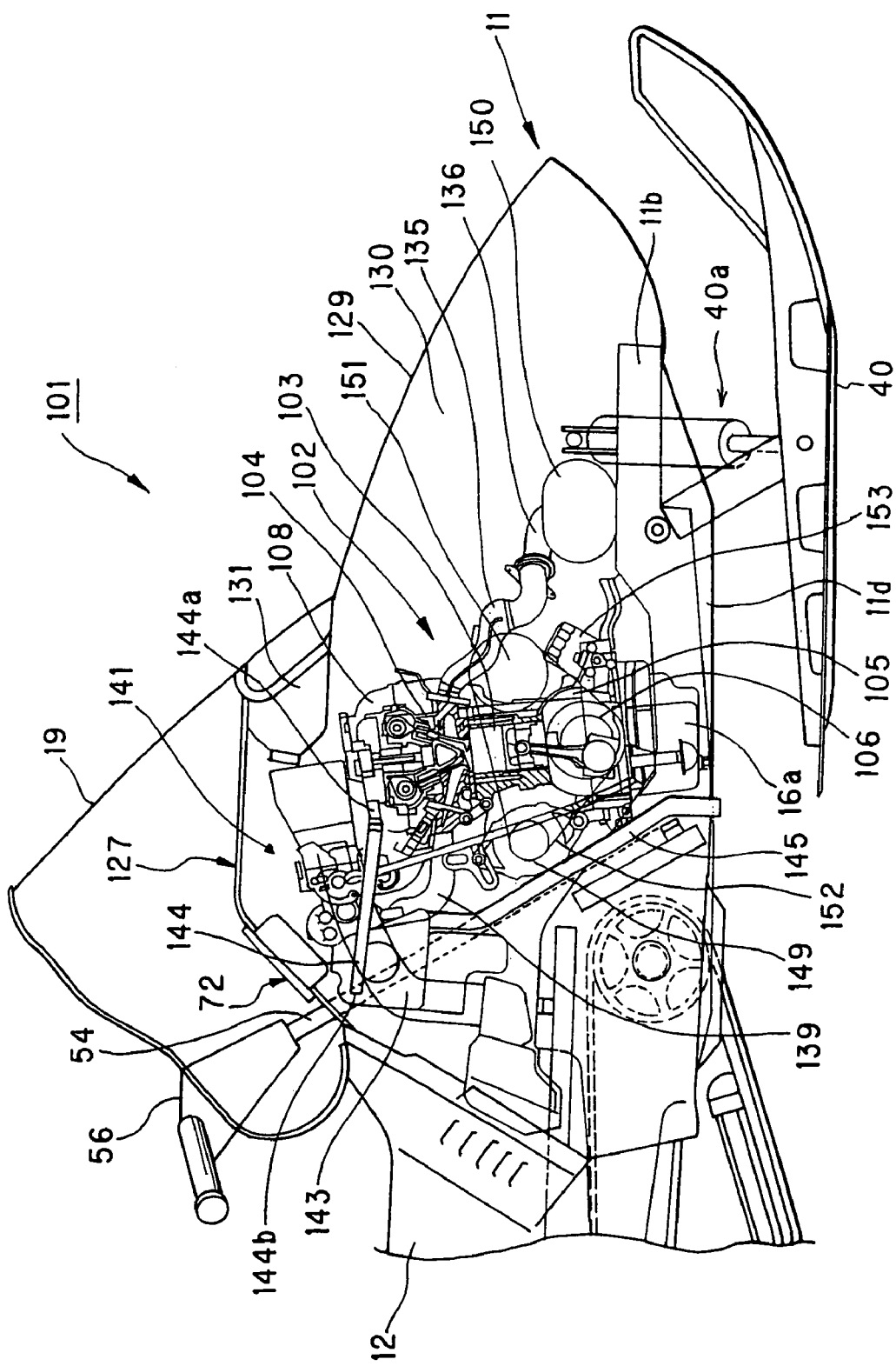
FIG. 9 is a side view showing the arrangement of a breather hose in accordance with the present embodiment.
Figure 10:
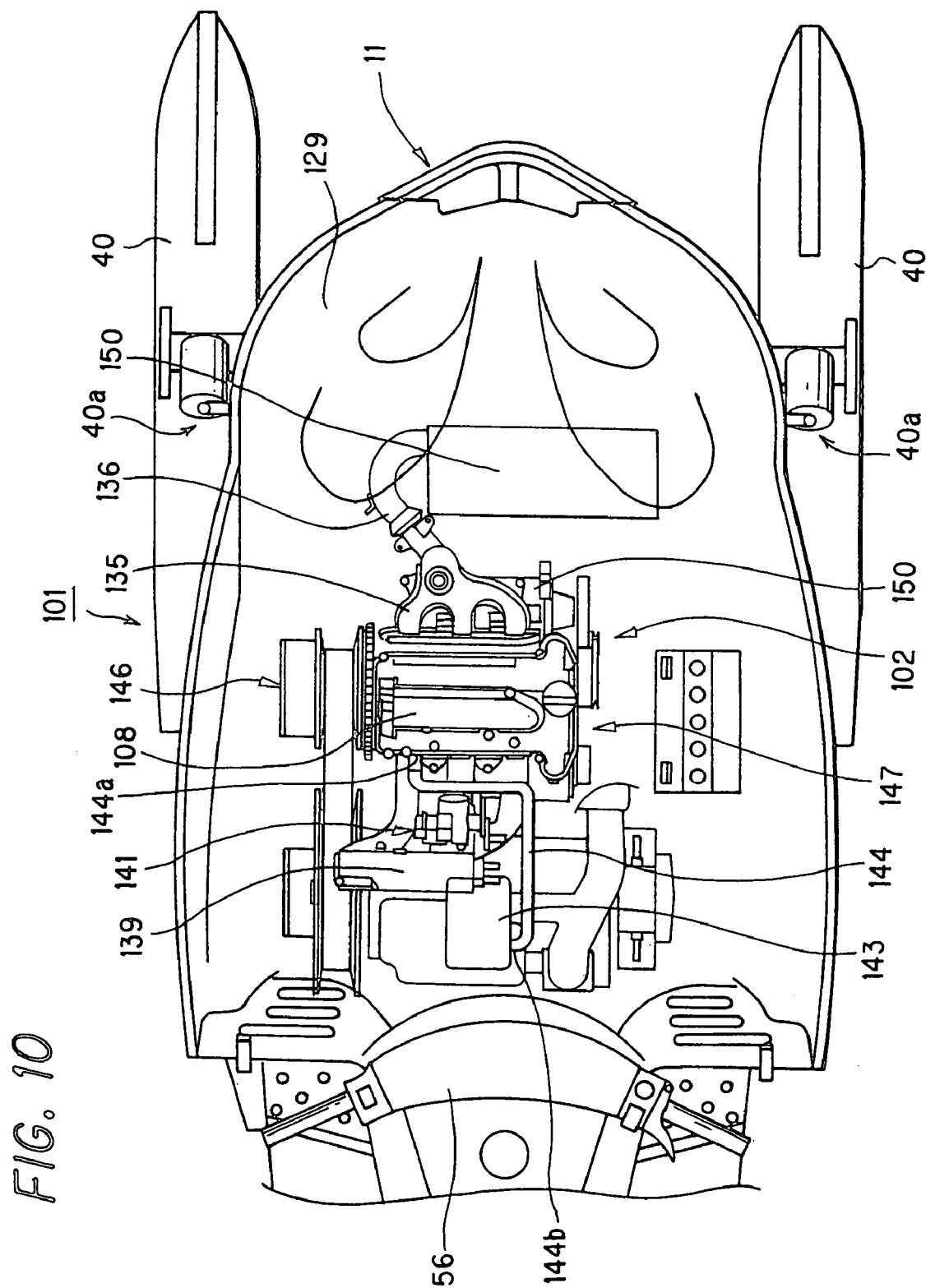
FIG. 10 is a plan view showing the arrangement of the breather hose.

FIG. 9 is a side view showing a breather hose configuration according to the present embodiment. FIG. 10 is a plan view showing the breather hose configuration.

To begin with, an exhaust manifold 135 is projectively extended frontwards from the front side of a cylinder head 104 while an intake manifold 139 is projectively extended rearwards from the rear side.

An upper crankcase 105 is disposed under the cylinders 103, and a lower crankcase 106 is disposed under the upper crankcase 105. Further, an oil pan 16*a* is placed under lower crankcase 106 and close to the bottom of engine room 130.

Formed on the rear side of the engine 102 body and in front of a steering post (steering shaft) 54 or between engine 102 body and steering post 54 is an intake passage including intake manifold 139, throttle body 141 and air cleaner box 143.

The intake manifold 139 is arranged at the side of the steering post 54 at a level higher than cylinder head 104, so that a downward current of air is supplied to the intake ports or air is supplied by 'downdraft'.

Part of the intake passage including the throttle body 141 is arranged at a level higher than cylinder head 104 inside engine room 130 and laid out in the space over engine 102, under an instrument panel 127 and behind a headlight 131.

The air cleaner box 143 is arranged at the rear of a head cover 108 that covers the cylinder head 104. First and second breather hoses 144 and 145 are provided to connect the interior of the head cover 108 with air cleaner box 143 and to connect the interior of air cleaner box 143 to the outside, respectively.

One end of first breather hose 144, as shown in FIGS. 9 and 10, is connected to the rear side of head cover 108 on the drive-clutch side 146 and the hose is extended approximately linearly, and parallel to, the axial direction of crankshaft 22 (FIG. 1) from the drive clutch side 146 to the opposite side 147 and bent perpendicularly, when viewed from top, and further extended and connected at the other end to air cleaner box 143. Thus, the interior of head cover 108 and the interior of air cleaner box 143 are connected.

Further, when the body of snowmobile 101 is in its horizontal position, the first breather hose 144 is positioned so that its joint 144*a* to head cover 108 is lower than its joint 144*b* to air cleaner box 143.

The second breather hose 145 is connected at one end to the bottom of air cleaner box 143 and extended downwards approximately linearly avoiding interference with other engine components. The other end is arranged penetrating through the bottom, designated at 11*d*, of the front body and opening to the outside, whereby the water inside air cleaner box 143 is drained to the outside of the body.

An alternator 149 is arranged under the intake manifold 139 and behind cylinders 103.

As shown in FIGS. 9 and 10, exhaust manifold 135 arranged in front of the engine 102 or in front of the cylinder head 104 is connected to an exhaust pipe 136, which is in turn connected to a muffler 150 located at a position more frontwards, or in the vicinity of a front suspension housing 11*b* formed in the bottom lid of the principal portion of a frame front 11.

Arranged in front of cylinders 103 under exhaust manifold 135 is a water pump 151 at a position approximately opposite the alternator 149 with the cylinders 108 in between. This water pump 151 is driven together with the alternator 149 by a drive belt 152 which is driven by crankshaft 22, whereby it injects and supplies cooling water by way of a cooling water passage (not shown) to a water jacket (not shown) formed inside the engine to thereby cool engine 102.

An oil filter 153 is arranged in front of lower crankcase 106 under this water pump 151.

Next, the intake operation of the intake structure of the snowmobile engine according to the present embodiment will be described with reference to the drawings.

As shown in FIG. 9, air flowing into engine room 130 as snowmobile 101 travels is drawn from above engine 102 into the intake passage. Air is first cleaned passing through air cleaner box 143 located above and behind engine 102 and then the clean air is sent together with the flow of fuel regulated by throttle body 141 into intake manifold 139. The mixture gas of air and fuel sent to the intake manifold 139 is blown downwards against cylinder head 104 side and supplied to the combustion chamber.

As has been described heretofore, according to the intake structure of a snowmobile engine of the present embodiment the arrangement of the intake passage including intake manifold 139, throttle body 141 and the like on the rear side of the engine 102 body and in front of steering post 54 or between engine 102 body and steering post 54, makes it possible to set engine 102 closer to the body center. Thereby, it is possible to adjust the weight balance of snowmobile 101, in a beneficial manner and hence improve its maneuverability.

According to the present embodiment, the intake passage including intake manifold 139 and throttle body 141 is arranged at a position higher than the engine 102 body so as to provide a so-called downdraft configuration in which air is supplied from intake manifold 139 located at a higher position to cylinder head 104 located at a lower position. Therefore, the intake passage including intake manifold 139 and throttle body 141 can receive air during travel without being blocked by the engine 102 body, so that it is possible to improve the air-cooling effect of the flow of air during travel.

Further, according to the present embodiment, since the intake manifold 139 is arranged at the side of the steering post, it is possible to achieve a space-saving engine layout.

According to the present embodiment, engine hood 129 is formed in front of instrument panel 127 so that it starts at a position stepped down a degree from the front end of the instrument panel 127 toward the front end while headlight 131 is arranged at the stepped portion between the engine hood 129 and instrument panel 127. Further, throttle body 141 as a carburetor is disposed behind headlight 131 under instrument panel 127 inside engine room 130. Therefore, it is possible to construct engine hood 129 without any restriction of the engine height.

According to the present embodiment, since the engine 102 includes air cleaner box 143 in the rear of head cover 108 covering cylinder head 104 and first breather hose 144 which connects the interior of head cover 108 with that of air cleaner box 143, oil mist, water, etc., arising in head cover 108 can be returned to the air cleaner box 143 side.

Further, since the first breather hose 144 is extended approximately linearly and parallel to the axial direction of crankshaft 22 from the drive clutch side 146 to the opposite side 147, no oil or water will stagnate within the first breather hose 144, so there is no fear of freezing.

According to the present embodiment, since, when the snowmobile body is in its horizontal position, the first breather hose 144 is positioned so that its joint to the head cover is lower than its joint to the air cleaner box, there is no risk of oil leaking if the body is tilted during travelling or during stopping.

Further, according to the present embodiment, since the engine 102 includes second breather hose 145 which connects the interior of air cleaner box 143 to the outside of the body, there is no risk of water stagnating within the intake passage such as air cleaner box 143, throttle body 141 and the like or within the intake pipes. Accordingly, it is possible to prevent freezing inside the intake passage. Further, since the second breather hose 145 is connected at one end to the bottom of air cleaner box 143 while the other end is arranged penetrating through the bottom of the front body and opening to the outside, the water inside air cleaner box 143 can be drained to the outside of the body.

The intake system of a snowmobile engine of the present invention should not be limited to the above-illustrated embodiments but various modifications may be added without departing from the features of the present invention.

As has been described heretofore, according to the present invention, since the four-cycle engine is tilted rearwards so that part of the intake system over the engine can be accommodated on the rear side of the headlight inside the topmost portion of the engine hood, it is possible to avoid its interference with the engine hood and headlight and yet markedly reduce the full height of the engine compared to the configuration where the engine is mounted in its upright position. Further, the rear tilt arrangement of the four-cycle engine in the engine hood of the front body makes the center of gravity of the engine close to the center of the body and also lowers the center of gravity of the snowmobile because of the lower positioning of the cylinder head, whereby it is possible to improve the maneuverability and travelling performance of the snowmobile. Further, the rear tilt arrangement of the engine creates a more space in front of the engine so that exhaust pipes and other components can be laid out with more flexibility, hence it is possible to further reduce the height of the engine hood. Since, if the intake system connected to the rear part of the engine is arranged over the engine the elements of the intake system can be arranged behind the headlight in the topmost portion of the engine hood, it is possible to improve the space efficiency without the need of modification or reconstruction such as increasing the height of the engine hood.

In the above arrangement, the upward projected portion is formed at the topmost portion of the engine hood and the headlight and instrument panel for indicating the vehicle's condition are arranged at the front and rear of the projected portion, respectively, so that it is possible to insert at least part of the intake system into the space sandwiched between the headlight and the instrument panel inside the projected portion. In this way, it is possible to make use of the empty space behind the headlight at the topmost portion of the engine hood, in which the headlight and instrument panel are disposed, and to interpose part of the intake system in an efficient manner, whereby it is possible to make the shape of the engine hood short in its height.

The exhaust system is constructed of an exhaust manifold connected to the exhaust ports at the front of the cylinder head and an exhaust muffler arranged in front of the engine and connected to the exit side of the exhaust manifold by an exhaust pipe, all being accommodated inside the engine hood while an opening of an exhaust lead pipe from the muffler is arranged in the body bottom at the center with respect to the body width direction so that exhaust can be discharged outside the body from the opening. Accordingly, exhaust can be discharged from the body bottom at the center with respect to the body width direction. That is, since exhaust noise from the body bottom can be dispersed to both sides and since the exhaust opening is located in the front body, the noise arises at a position away from the rider so that the exhaust noise will not be very harsh to the rider while travelling. Further, since the opening is located at the center of the body width, the exhaust noise during travelling will scatter equally to both sides, and since the opening is directed downwards, extra muffling effects from the snow surface and from the snow scattered by the steering ski-runners can be expected.

Further, since the muffler is located below the engine cylinders, the exhaust pipe, connected to the exhaust manifold, can be extended frontwards and downwards up to the muffler. Accordingly, the layout of the exhaust pipe from the engine up to the muffler is inclined downward as it goes frontwards, so that this arrangement compliments the engine hood configuration which lowers as it goes frontward to improve the aerodynamic performance.

Since the muffler, formed of an approximate cylindrical shape, is arranged with its cylindrical axis set along the body width direction while exhaust from the engine is led into the muffler by way of the exhaust pipe that is connected to one side of the muffler with respect to the body width direction, it is possible to mount the muffler within the engine hood without the necessity of taking a large space in the longitudinal direction.

Further, it is preferred that the four-cycle engine is mounted in the engine hood with the lengthwise center of the crankshaft off-centered to one side with respect to the body width direction. This arrangement provides an efficient use of the left and right spaces in the engine room as well as contributes to body balance adjustment with respect to the body width direction.

It is also preferred that the clutch mechanism is arranged at one side of the engine while the battery is arranged at the other side in the engine hood. This arrangement makes it easy to adjust the weight balance with respect to the body width direction.

It is preferred that electrical equipment is attached to the battery holder for holding the battery. This makes it possible to adjust the weight balance in a more exact manner, by attaching electrical equipment such as an ECU, CDI unit to the battery holder. Further, since electrical equipment can be laid out next to the engine, it is possible to shorten their lead wires from the engine, hence simplify the routing of wires.

Further, according to the intake structure of a snowmobile engine of the embodiment of the present invention, the engine can be mounted at the center of the snowmobile body in a simple manner without any interference with the engine hood, and yet no oil leakage will occur if the body is tilted, and it is also possible to prevent freezing within the intake passage.

In detail, it is possible to mount the engine at the center of the body by constructing the intake structure of the engine so that the intake passage including an intake manifold etc., is disposed at the rear side of the engine body and in front of a steering post or between the engine body and steering post.

Further, since the engine hood is formed in front of the instrument panel so that it starts at a position stepped down a degree from the front end of the instrument panel toward the front end while the throttle body as a carburetor is disposed in a space under the instrument panel, at the stepped portion between the engine hood and instrument panel, it is possible to form the engine hood without any restriction of the engine height. Since the intake passage including the throttle body and the like is set at a position higher than the engine body so as to supply air to the intake manifold by downdraft, no air during travel will be blocked by the engine, so that it is possible to improve the air-cooling effect of the flow of air during travel. Since the intake manifold is arranged at the side of the steering post, it is possible to achieve a space-saving engine layout.

Provision of the first breather hose that connects the interior of the head cover with the interior of the air cleaner box for the engine makes it possible to prevent oil leakage if the snowmobile body is tilted. Further, provision of the second breather hose that connects the interior of the air cleaner box to the outside of the snowmobile body produces an excellent effect of eliminating stagnation of water in the intake passage including an air filter, intake pipe, carburetor, etc., and hence preventing the freezing inside the intake passage.

What is claimed is:

1. A snowmobile comprising:
a vehicle body;
a four-cycle engine mounted in an engine compartment of the vehicle body and covered by an engine hood, the engine having a crankshaft and a cylinder, the crankshaft being oriented along a vehicle body width direction, an axis of the cylinder being tilted rearward with respect to a vertical line of the vehicle body;
an oil pan of the four-cycle engine disposed in a vicinity of and adjacent to a lowest portion of the engine compartment; and
an oil strainer provided in the oil pan.

2. The snowmobile according to claim 1, wherein the engine is a four-cycle double overhead cam engine.

3. The snowmobile according to claim 1, wherein a water pump is arranged on a front side of the engine.

4. The snowmobile according to claim 1, wherein an oil filter is arranged at the front of a crankcase of the engine.

5. The snowmobile according to claim 1, wherein the engine is arranged in front of a steering post, the steering post being equipped with a steering device at a top end thereof for maneuvering the snowmobile, the steering post being set up in the engine compartment so that it stands with its steering device tilted to the rear.

6. The snowmobile according to claim 5, wherein an intake manifold constituting part of an intake passage is disposed between the steering post and the engine.

7. The snowmobile according to claim 6, wherein a carburetor constituting part of the intake passage is disposed in a space behind a headlight under an instrument panel inside the engine compartment.

8. The snowmobile according to claim 7, wherein the carburetor is disposed at a level higher than a cylinder head of the engine.

* * * * *